United States Patent
Liu (10) Patent No.: US 11,101,867 B2
(45) Date of Patent: Aug. 24, 2021

(54) REDUCING BEAMFORMING FEEDBACK SIZE IN WLAN COMMUNICATION

(71) Applicant: MediaTek Singapore Pte. Ltd., Solaris (SG)

(72) Inventor: Jianhan Liu, San Jose, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

(21) Appl. No.: 16/563,592

(22) Filed: Sep. 6, 2019

(65) Prior Publication Data

US 2020/0112353 A1    Apr. 9, 2020

Related U.S. Application Data

(60) Provisional application No. 62/743,008, filed on Oct. 9, 2018.

(51) Int. Cl.
| | |
|---|---|
| H04L 5/00 | (2006.01) |
| H04B 7/06 | (2006.01) |
| H04B 7/0417 | (2017.01) |
| H04B 7/0456 | (2017.01) |

(Continued)

(52) U.S. Cl.
CPC ........ *H04B 7/066* (2013.01); *H04B 7/0421* (2013.01); *H04B 7/0456* (2013.01); *H04B 7/0617* (2013.01); *H04B 7/0626* (2013.01); *H04B 7/0632* (2013.01); *H04B 7/0641* (2013.01); *H04L 25/0204* (2013.01); *H04L 5/0007* (2013.01); *H04W 84/12* (2013.01)

(58) Field of Classification Search
USPC .................. 370/329, 208; 375/267
See application file for complete search history.

(56) References Cited

U.S. PATENT DOCUMENTS

2005/0237971 A1* 10/2005 Skraparlis ............ H04L 1/0618
370/329
2005/0265436 A1    12/2005 Suh et al.
(Continued)

FOREIGN PATENT DOCUMENTS

EP    3163837 A1    5/2017

OTHER PUBLICATIONS

Chau Yuen, et al. "Beamforming Matrix Quantization with Variable Feedback Rate," PIMRC 2008, pp. 1-5, submitted on Jun. 20, 2008. (https://arxiv.org/abs/0806.3329).

*Primary Examiner* — Eva Y Puente (57) ABSTRACT

Mechanisms of reducing beamforming feedback reporting sizes in WIFI communication. At a beamformee STA, beamforming feedback matrices generated from channel estimation are subject to two compression processes: first compressed to angles through Givens rotation and then further compressed by using source coding. The double compressed feedback information is transmitted in a report to the beamformer. Accordingly, the beamformer reconstructs the feedback matrices by first decompressing the reported information by source decoding and then further decompressing based on the Givens rotation. In some other embodiments, the beamformee STA uses a beambook to map the beamforming feedback matrices to predetermined beamforming vectors. The associated indices of the vectors, which may be compressed, are transmitted in a beamforming feedback report.

18 Claims, 8 Drawing Sheets

(51) Int. Cl.
*H04L 25/02* (2006.01)
*H04W 84/12* (2009.01)

(56) References Cited

U.S. PATENT DOCUMENTS

| | | |
|---|---|---|
| 2007/0104087 A1* | 5/2007 | Tee ................... H04B 17/336 |
| | | 370/208 |
| 2008/0130778 A1 | 6/2008 | Xia et al. |
| 2014/0093005 A1 | 4/2014 | Xia et al. |
| 2015/0009940 A1* | 1/2015 | Liu ..................... H04L 5/0023 |
| | | 370/329 |
| 2017/0331534 A1 | 11/2017 | Jiang et al. |
| 2018/0041263 A1* | 2/2018 | Zhang .............. H04L 25/03343 |
| 2019/0097709 A1* | 3/2019 | Joetten ............... H04B 7/0456 |
| 2019/0140728 A1* | 5/2019 | Moon ................ H04B 7/0617 |

\* cited by examiner

| Size of V (Nr x Nc) | Number of angles (Na) | Number of feedback bits (80MHz, CB info. = 1, Ng=4) | Number of feedback bits (80MHz, CB info. = 0, Ng=16) | Number of feedback bits for (320MHz, CB info. = 1, Ng=4) | Number of feedback bits for (320MHz, CB info. = 0, Ng=16) |
|---|---|---|---|---|---|
| 8x2 | 26 | 32,516 | 5,008 | 130,016 | 19,984 |
| 8x8 | 56 | 70,064 | 10,816 | 280,064 | 43,072 |
| 16x2 | 58 | 72,516 | 11,152 | 290,016 | 44,560 |
| 16x16 | 240 | 300,128 | 46,208 | 1,200,128 | 184,448 |

REDUCING BEAMFORMING FEEDBACK SIZE IN WLAN COMMUNICATION

CROSS REFERENCE TO RELATED APPLICATION

This patent application claims priority and benefit of: the U.S. Provisional Patent Application No. 62/743,008, entitled "METHODS OF REDUCING BEAMFORMING FEEDBACKS IN WLAN," filed on Oct. 9, 2018, the entire content of which is herein incorporated by reference for all purposes.

TECHNICAL FIELD

Embodiments of the present disclosure relate generally to the field of wireless network communication, and more specifically, to the field of beamforming mechanisms in wireless local area network (WLAN) communication systems.

BACKGROUND OF THE INVENTION

Beamforming technology is widely used in different types of wireless communication systems. In WLAN communication systems, e.g., WIFI, beamforming, also known as beam steering, is defined as a spatial filtering mechanism used at a transmitter (a beamformer station (STA)) to improve the signal power or signal-to-noise ratio (SNR) at an intended receiver (a beamformee STA). It basically involves applying a steering matrix to adjust the signal amplitudes and phase of the beamformer antennas to focus the signal transmission toward the beamformee direction, and at the same time, to avoid receiving or creating interference.

When using explicit feedback in channel sounding, a beamformee makes a direct estimate of a channel from training symbols sent from the beamformer. The beamformee may generate channel state information (CSI) or steering feedback based on an observation of these training symbols. The beamformee quantizes the feedback and sends it to the beamformer. The beamformer can use the feedback as the basis for determining the beamforming steering matrix.

In wireless communication systems compliant with IEEE 802.11 family standards and specifications, an estimated channel is represented by using beamforming feedback matrices V and SNRs (eigenvalues). To reduce the size of the beamforming feedback information which often consumes significant transmission time and bandwidth as overhead, the feedback matrices are compressed into angles using Givens rotations, before being fed back to the beamformer along with the SNRs.

Figure 1:
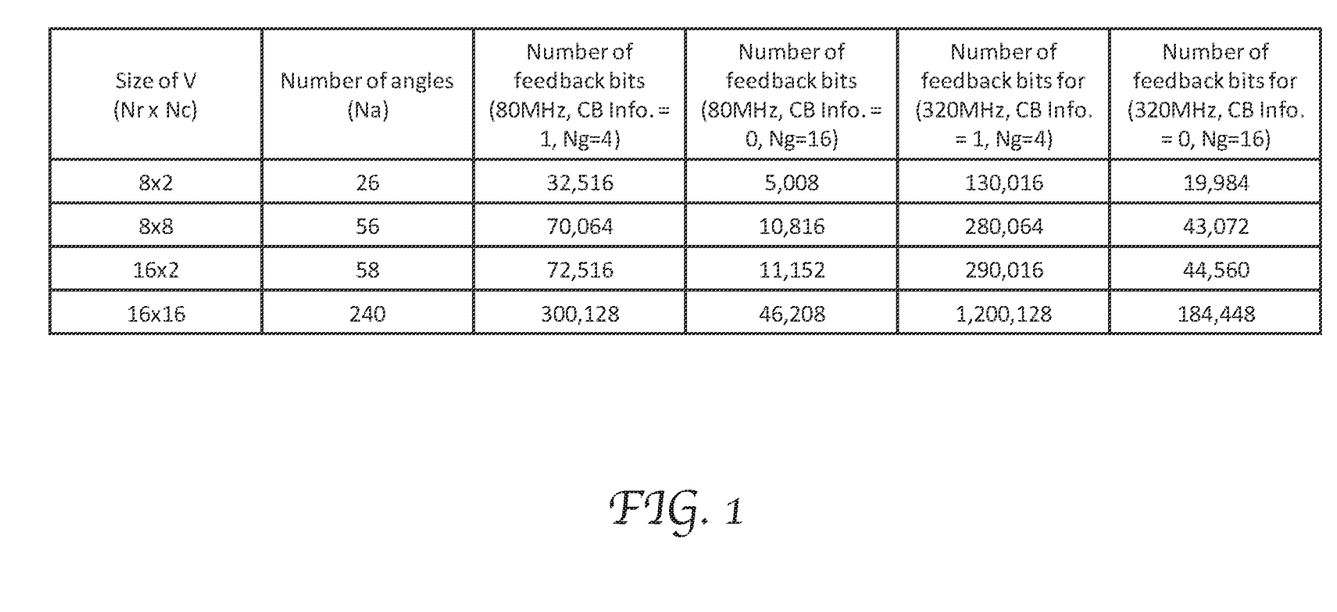
FIG. 1 is a table showing the various numbers of bits used for reporting compressed beamforming feedback matrices in different multiple input multiple output (MIMO) and bandwidths according to the conventional method.

FIG. 1 is a table showing the various numbers of bits used for reporting compressed beamforming feedback matrices in different multiple input multiple output (MIMO) and bandwidths according to the conventional method. For example, between two STAs each with 16 antennas (Nr and Nc denote the row number and column numbers of the matrices), as a result of compression, the number of angels generated for each subcarrier or subcarrier group is 240, and the feedback ranges from 300,128 bits to 1,200,128 bits depending on a few factors, including the channel bandwidth (80 MHz or 320 MHz), the group length (Ng), and whether collaborative beamforming (CB) is used. The data demonstrate that the amount of information for reporting compressed beamforming feedback can still be considerably large, especially for large antenna arrays and large bandwidths. One approach to further reduce the size of compressed beamforming feedback uses greater group lengths, e.g., Ng=16, or 32. However, this inevitably decreases the accuracy of feedback reporting and degrades the beamforming performance, especially in multi-user (MU) MIMO scenarios.

SUMMARY OF THE INVENTION

Therefore, it is desirable to further reduce the amount of information used for beamforming feedback reporting without decreasing reporting accuracy, and thereby reduce overhead of beamforming data transmission and improve network efficiency and throughput. Embodiments of the present disclosure are directed to systems and methods of channel sounding that generate and use reduced amount of beamforming feedback information in WIFI transmission communication.

Embodiments of the present disclosure include a mechanism of providing beamforming feedback information which involves using a source coding method to further compress already-compressed feedback matrices. Particularly, in a channel sounding process, once receiving training signals from a beamformer, a beamformee performs channel estimation and generates beamforming feedback matrices and SNRs for respective subcarriers or subcarrier groups. The feedback matrices are first compressed into angels by using a Givens rotation method. The angels are then further subject to a source coding process to generate further compressed beamforming feedback which has an even smaller size than the first compressed feedback. The further compressed beamforming feedback and the SNRs are transmitted to the beamformer as beamforming feedback information, e.g., in a CSI frame. In some embodiments, the MU-MIMO control field in the CSI frame may include a subfield defined to indicate two possible scenarios: further compression by source coding applied, and no further compression by source coding applied.

Based on the indications in the MIMO control field, the beamformer decompresses the beamforming feedback information first by source decoding and then by Givens rotation decompression. As a result, the beamforming feedback matrices are restored and used to generate a steering matrix to control the beamformer antennas.

In some embodiments, a channel metric may be generated based on an estimated channel response and then used to generate a beamforming feedback matrix. The channel metric can be the subspace projection between the estimated channel of a subcarrier and the space of estimated channels of its neighboring subcarriers. In some embodiments, the channel metric can be a difference between an estimated channel and an average of a group estimated channel. This can further reduced the size of beamforming feedback, especially when the channel responses are close to each other.

Embodiments of the present disclosure further provide a mechanism for reducing the sizes of beamforming feedback information by reporting beambook indices to a beamformer, instead of reporting compressed beamforming feedback matrices. More specifically, the beamforming and beamformee each maintain a beambook containing a plurality of predetermined entries of beamforming vectors, and indices of the entries. The indices may be in the form of codeword. For each subcarrier or subcarrier group, the beamformee generates a set of beamforming feedback information based on channel estimation. The generated information is mapped to the beambook to find a matching predetermined entry. The beambook index of the matching entry is selected and specified in the beamforming feedback report. In some embodiments, the beambook indices may be compressed by source coding and the compressed indices are specified in a beamforming feedback report. In some embodiments, the set of beamforming feedback information additionally includes a set of parameter metrics which can be fed back along with each beam index, such as SNR, transmit power and/or channel variation metrics, etc.

Upon receiving the report, the beamformer uses the specified beambook indices to look up the beambook and find the matching predetermined entries as the reported beamforming feedback information.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Reducing Beamforming Feedback Size in WLAN Communication

Embodiments of the present disclosure provided mechanisms of reducing beamforming feedback reporting sizes in WIFI communication. In some embodiments, at a beamformee station (STA), beamforming feedback matrices generated from channel estimation are subject to two compression processes. The matrices are first compressed into angles by using Givens rotation, which are further compressed by using source coding. The double compressed feedback information is transmitted in a report to the beamformer. Accordingly, the beamformer reconstructs the feedback matrices by first decompressing the reported information based on source coding and then further decompressing based on the Givens rotation.

In some embodiments, the beamformer and beamformee are each preloaded with a beambook which includes a set of predetermined beamforming vectors associated with indices for each subcarrier or subcarrier group. After channel estimation, the beamformee generates beamforming feedback matrices and maps them to the beambook to find the matching indices. The matching indices are then transmitted to the beamformer in a feedback report. Accordingly, the beamformer uses the reported indices to look up the beambook and to find the corresponding predetermined entries as reported beamforming feedback.

Figure 2:
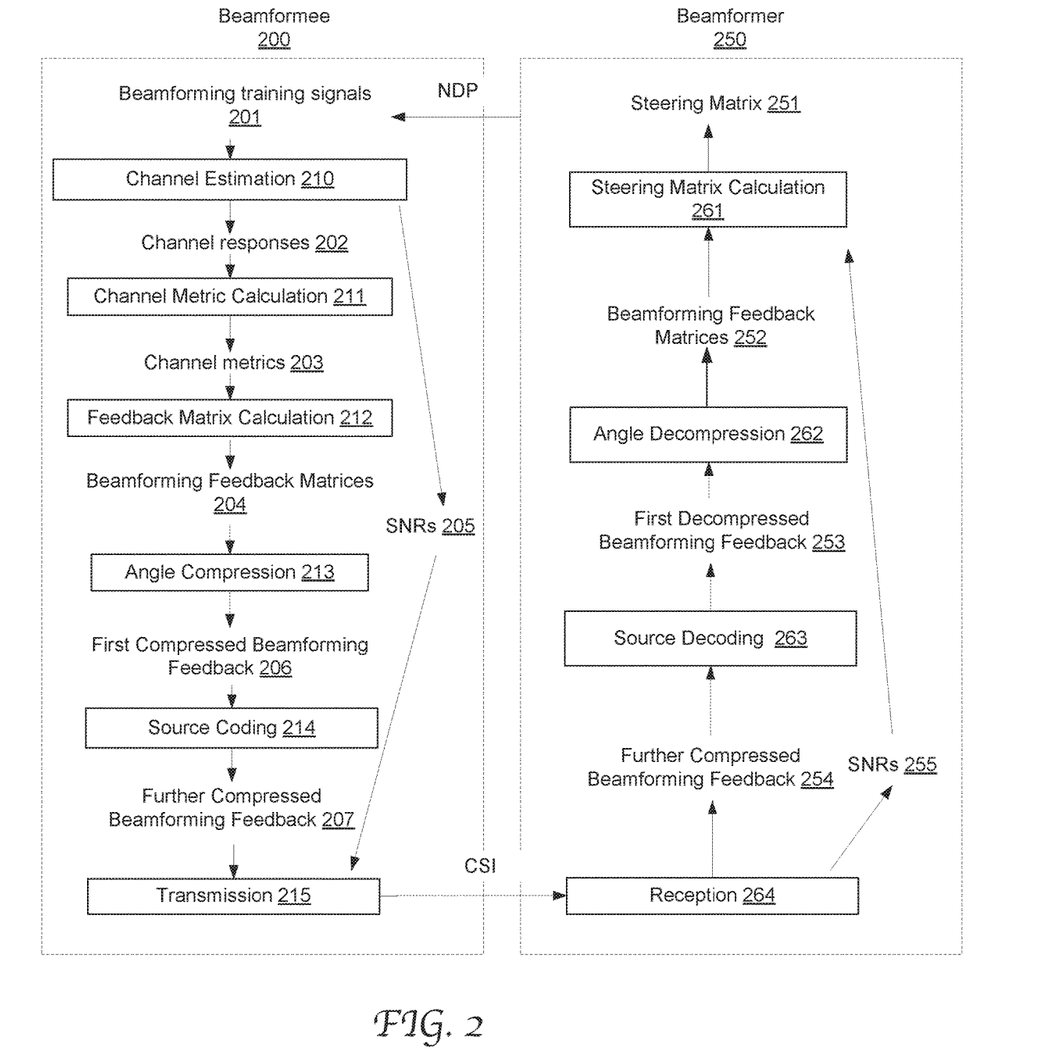
FIG. 2 illustrates the information flow within and between a beamformer and a beamformer in an exemplary channel calibration procedure that utilizes source coding further compression in accordance with an embodiment of the present disclosure.

FIG. 2 illustrates the information flow within and between a beamformer and a beamformer in an exemplary channel calibration procedure that utilizes source coding further compression in accordance with an embodiment of the present disclosure. The beamformer 250 transmits a Null Data Packet (NDP) frame to the beamformee 200 which carries out channel sounding by analyzing the received training symbols 201 in the NDP. For example, in an NDP, there is a very high throughput long training field (VHT-LTF) for each spatial subcarrier used in transmission, and hence to be used in the beamforming data transmission.

The beamformee performs channel estimation 210 based on the training symbols and accordingly generates a beamforming feedback matrix 204 and an SNR for each subcarrier or subcarrier group and a SNR 205. The feedback matrix represents channel responses for the training symbols. The feedback matrices are then transformed into angles by matrix multiplication operations, or referred to herein as angle compression 213, e.g., Givens rotation, and thereby the first compressed beamforming feedback 206 is generated.

In some embodiments, the beamforming feedback matrix 204 is generated directly by using the estimated channel response (e.g. 202) of the subcarrier, particularly by using singular value decomposition (svd) of the estimated response. For example, $H_j$ is the estimated channel response for subcarrier j, and its beamforming feedback matrix $V_j$ is obtained as:

$$V_j = svd(H_j)$$

In some other embodiments, as shown, a channel metric 203 is first calculated at 211 based on the estimated channel response 202, and the channel metric 203 is then used to calculate the feedback matrix 204 at 212. In this manner, the feedback matrices can be shaped into forms with less redundancy and a compressed version thereof has an even smaller size.

For example, the channel metric may be the subspace projection between the estimated channel response $H_j$ and the space of a group of estimated channel responses associated with its neighboring subcarriers (index k=(j−M)~(j+M)). For example, the beamforming feedback matrix is determined by:

$$V_j = svd(H_j \tilde{V})$$

$$\tilde{V} = svd\left(\sum_{j-M}^{j+M} H_k H_k^*\right)$$

wherein $\tilde{V}$ is the space of the estimated channel responses of the neighboring subcarriers (j−M)~(j+M), and $H^*_k$, is the Hermitian of the channel response $H_k$.

In some embodiments, a channel metric can be a difference between the estimated channel response of an instant subcarrier and the average ($\tilde{H}$) of a group of channel responses of a set of subcarriers. For example, the beamforming feedback matrix is obtained by:

$$V_j = H_j - \tilde{H}$$

$V_j$ has a much smaller value than $H_j$ and can further reduce the size of feedback reporting.

According to embodiments of the present disclosure, source coding 214 is performed on the first compressed beamforming feedback 206 (e.g., composed of angles resulting from the Givens rotation) to generate the further compressed beamforming feedback 205. In some embodiments, the source coding compression includes arithmetic coding compression. The present disclosure is not limited to any specific method, process, logic or configuration to implement the source coding process. The source coding can be a lossy or a lossless compression process and can be implemented in any manner that is well known in the art. The compressed results from source coding are specified in a beamforming feedback report field of a CSI frame which is transmitted to the beamformer 250 at 215.

At 264, the beamformer 250 receives the CSI frame and resolve the feedback report field to derive the SNRs 255 and the further decompressed beamforming feedback 254. The feedback 254 is first subject to source decoding at 263 to reverse the source coding process and thereby generates first decompressed beamforming feedback 253. The decompressed feedback 253 is further decompressed to reverse the angle compression (referred to as "angle decompression" herein) and thereby recover the beamforming feedback matrices 252. A steering matrix 251 is calculated at 261 based on the recovered feedback matrices 252. The steering matrix is a precise mathematical description of how each individual antenna element in an antenna array should be controlled to attain a spatial path for the directed transmission, e.g., in terms of signal phase and amplitude.

Figure 3:
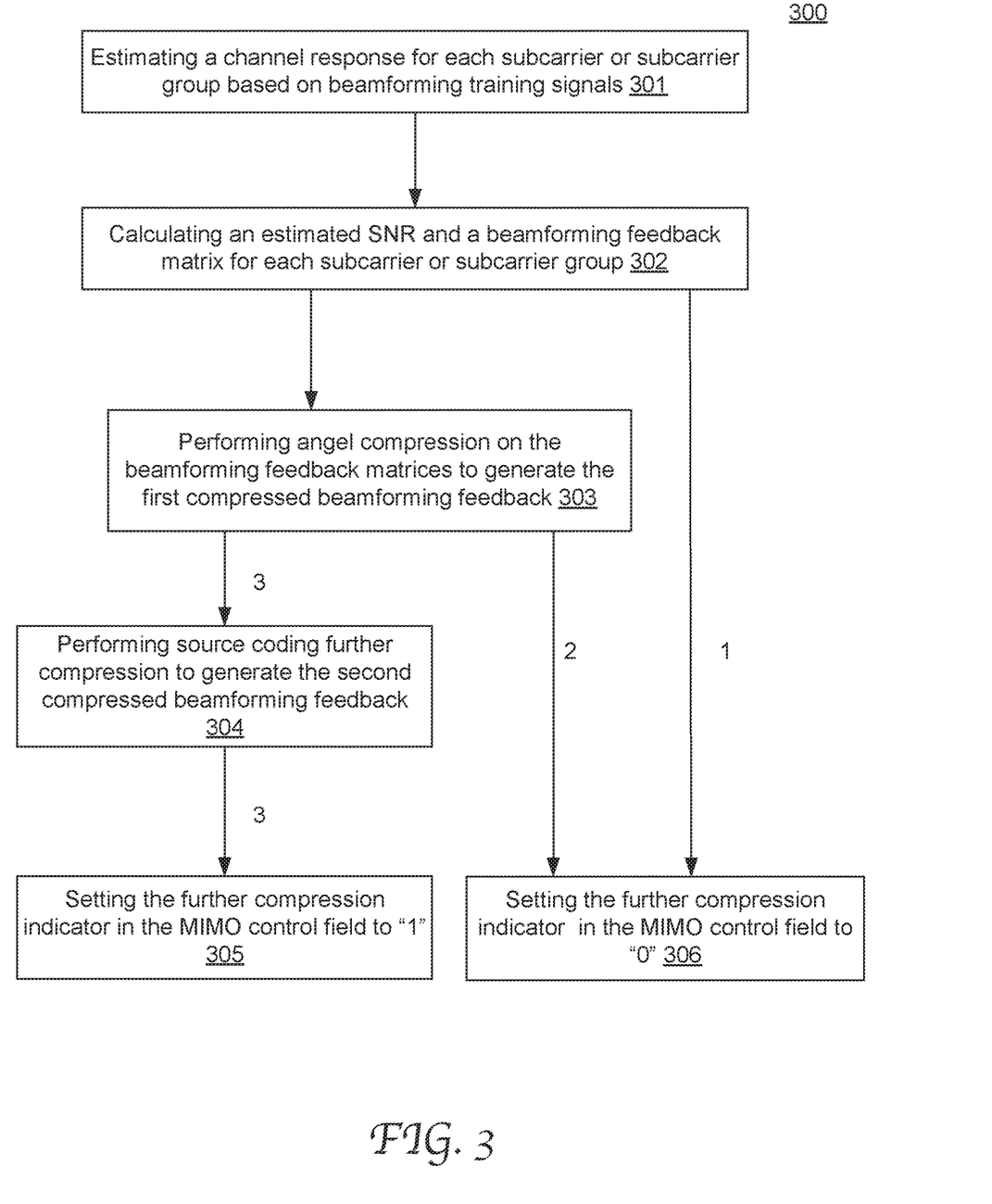
FIG. 3 is a flow chart depicting an exemplary process of generating a beamforming feedback report and signaling the compression mode of beamforming feedback matrices in accordance with an embodiment of the present disclosure.

FIG. 3 is a flow chart depicting an exemplary process 300 of generating a beamforming feedback report and signaling the compression mode of beamforming feedback matrices in accordance with an embodiment of the present disclosure. Process 300 can be performed by a beamformee STA, e.g., a non-AP STA. In this embodiment, the beamformee is configured to generate beamforming feedback in the report in 3 possible modes: without compression at all, with the angel compression only, and with source coding further compression. The reporting message (e.g., a CSI frame) includes a MIMO control field with a further compression indicator used to signal whether source coding further compression is applied to the reported feedback matrices.

At 301, the beamformee estimates the channel response based on beamforming training signals, e.g., included in a NDP transmitted from the beamformer. At 302, an estimated SNR and a beamforming feedback matrix are calculated for each subcarrier or subcarrier group. It will be appreciated that any suitable process can be used for this calculation without departing from the scope of the present disclosure. In some scenarios, as shown in path "1," the uncompressed matrices are specified in the beamforming report field of the CSI frame for transmission. In this scenario, the further compression indicator in the MIMO control field is set to "0." At 303, angle compression, e.g., based on Givens rotation, is performed on the matrices to generate first compressed beamforming feedback. In some other scenario, as shown in path "2" the resultant compressed feedback is specified in the beamforming report field of the CSI frame without subject to further compression. Thus, the further compression indicator in the MIMO control field is also set to "0" at 306. In still some other scenarios, as shown in path "3," at 304, the first compressed beamforming feedback is further compressed by using source coding compression to generate second compressed beamforming feedback which is specified in the beamforming report field of the CSI frame for transmission to the beamformer. At 305, the further compression indicator in the MIMO control field is set to "1."

Figure 4:
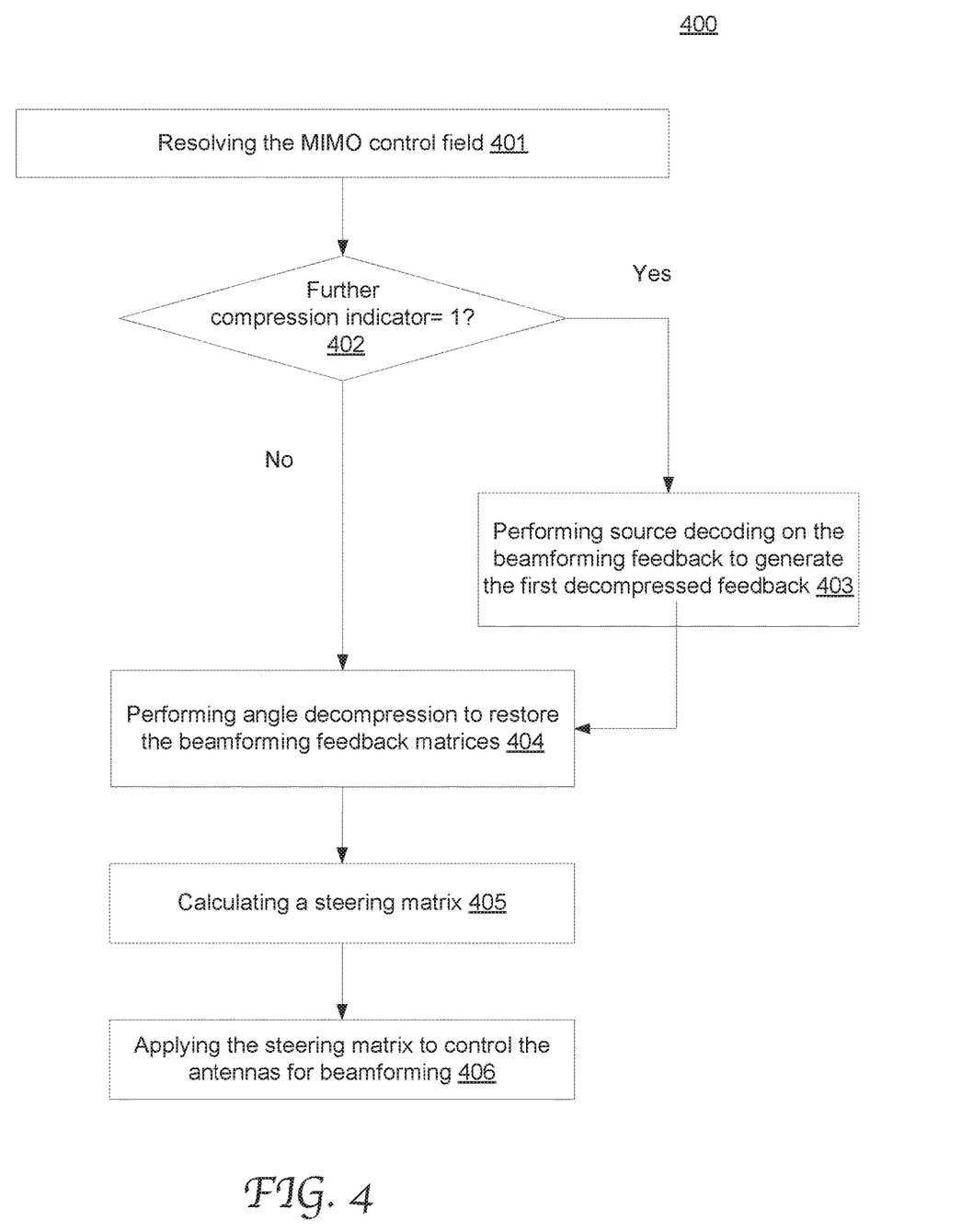
FIG. 4 is a flow chart depicting an exemplary process of beamforming in response to a beamforming feedback report and its further compression indicator in accordance with an embodiment of the present disclosure.

FIG. 4 is a flow chart depicting an exemplary process 400 of beamforming in response to a beamforming feedback report and its further compression indicator in accordance with an embodiment of the present disclosure. Process 400 can be performed in response to a received CSI frame by a beamformer STA, e.g., an AP STA. The CSI frame includes a MIMO control field with a further compression indicator. At 401, the beamformer resolves the MIMO control field, and determines (at 402) whether source coding further compression is indicated. If yes, the beamformer performs source decoding on the information in the beamforming report field to generate the first decompressed feedback (at 403). At 404, the beamformer further performs angle decompression on the first decompressed feedback to restore the beamforming feedback matrices. On the other hand, if the further compression indicator equals "0," at 404, the beamformer directly performs angle decompression to resolve the beamforming report field to restore the beamforming feedback matrices.

Based on the decompressed beamforming feedback matrices, the beamformer derives a steering matrix at 405. At 406, the steering matrix is then used by the transceiver to control the directionality of the beam in the following beamforming data transmission. Particularly, a spatial mapper in the transceiver uses the steering matrix to alter the transmitted data signal such that the energy is focused on the intended STA, e.g., the beamformee STA that transmits the CSI frame.

In some embodiments of the present disclosure, instead of being compressed, the beamforming feedback matrices are mapped to beambook indices in a lookup table, which have much smaller sizes, for transmission to the beamformer. The beamformer and beamformee STAs are each preloaded with a beambook lookup table. The beambook has a set of entries for each subcarrier or subcarrier group, each entry including a predetermined beamforming vector and an associated beambook index. After the beamformee generates the beamforming feedback matrices based on channel estimation, it looks up the beambook to find the matching predetermined beamforming vectors, and their indices are specified in the beamforming report field of the CSI frame for transmission to the beamformer. Conversely, the beamformer receiving the CSI frame restores the beamforming feedback matrices also by looking up the beambook. It will be appreciated that beamforming vectors included in a beambook can be defined to have any suitable content, form, or correlation with beamforming feedback matrices without departing the scope of the present disclosure. Depending on the definitions of the beamforming vectors, the search engine for the beambook varies accordingly in different embodiments.

Feeding back beambook indices consumes dramatically reduced transmission time and bandwidth compared to feeding back matrices themselves or even compressed matrices. For example, for one subcarrier in an 8×2 MIMO system, reporting compressed beamforming feedback resulting from Givens rotation alone requires at least 78 bits for a single-user (SU) transmission and 156 bits for a multi-user (MU) transmission. In contrast, in an exemplary beambook, 256 codes are used for 256 predetermined entries, and each subcarrier just requires 8 bits for the reported beambook index.

Figure 5:
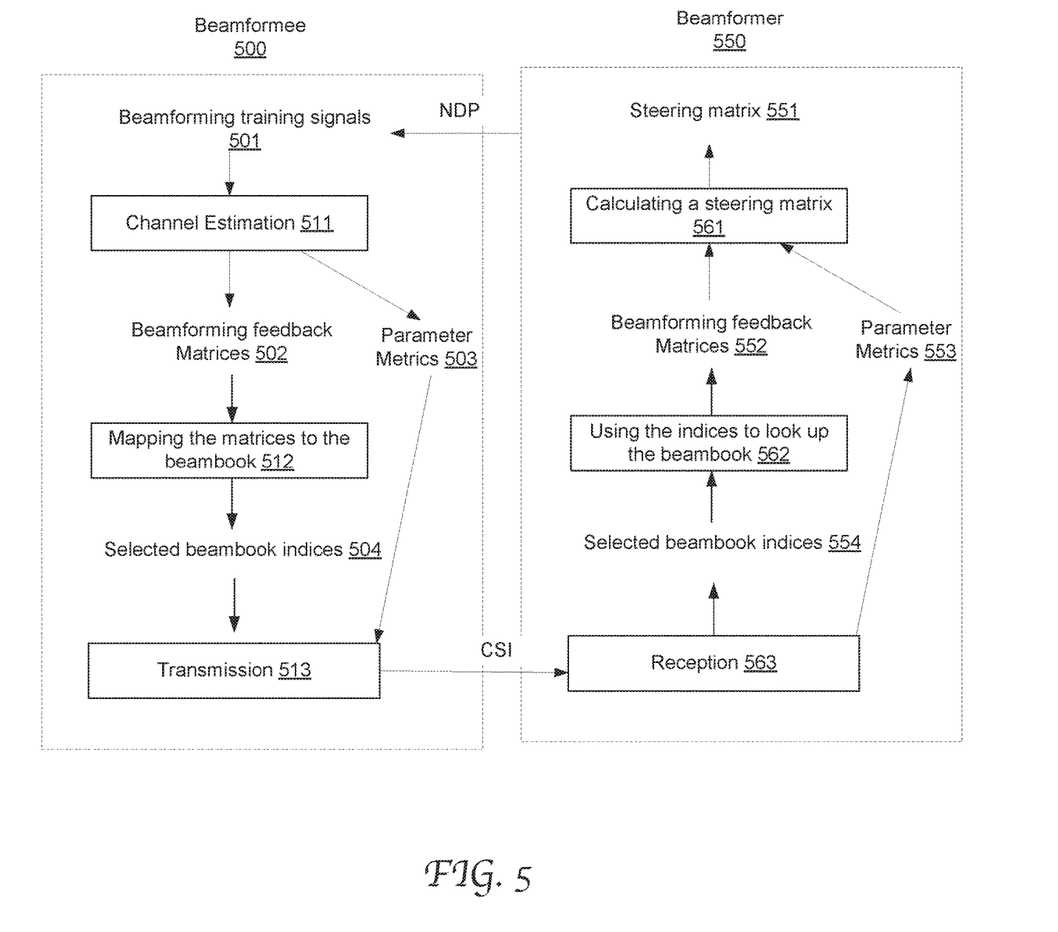
FIG. 5 illustrates the information flow within and between a beamformer and a beamformer in an exemplary channel calibration procedure that utilizes beambook indices in beamforming feedback reporting in accordance with an embodiment of the present disclosure.

FIG. 5 illustrates the information flow within and between a beamformer and a beamformer in an exemplary channel calibration procedure that utilizes beambook indices in beamforming feedback reporting in accordance with an embodiment of the present disclosure. The beamformer 550 transmits a NDP frame to the beamformee 500 which carries out channel sounding by analyzing the received training symbols 501 in the NDP. The beamformee performs channel estimation on the training signals to generate parameter metrics 503 and beamforming feedback matrices 502 for respective subcarriers or subcarrier groups. In some embodiments, the beamforming matrices 502 may be generated by calculating channel metrics based on channel responses, as described in greater detail with reference to FIG. 2. A parameter metric for each subcarrier may include SNR, transmit power and/or channel variation, etc.

For each generated feedback matrix, the beamformer maps it to the beambook and thereby finds a matching predetermined entry at 512, e.g., by comparison or any other suitable searching mechanism that is well known in the art. The indices 504 of the matching entries are selected and specified in the beamforming feedback report field of the CSI frame for transmission 513 to the beamformer 550. For each subcarrier or subcarrier group, a parameter metric 503 may be fed back as well.

At 563, the beamformer 550 receives and resolve the feedback report to obtain the reported beambook indices 554 and the parameter metrics. At 562, the beamformer 550 uses the indices to search the beambook and restore the predetermined beamforming feedback matrices 552. At 561, the restored matrices 552 and the parameter metrics 553 are used to calculate a steering matrix 551 for use of beamforming in following data transmission, as noted above.

In some embodiments, the beamformee may further reduce the feedback reporting size by compressing the beambook indices, e.g., by using source coding. In some embodiments, the MIMO control field of a CSI frame may include an index compression indication for indicating whether source coding compression is applied on the reported beambook indices.

Figure 6:
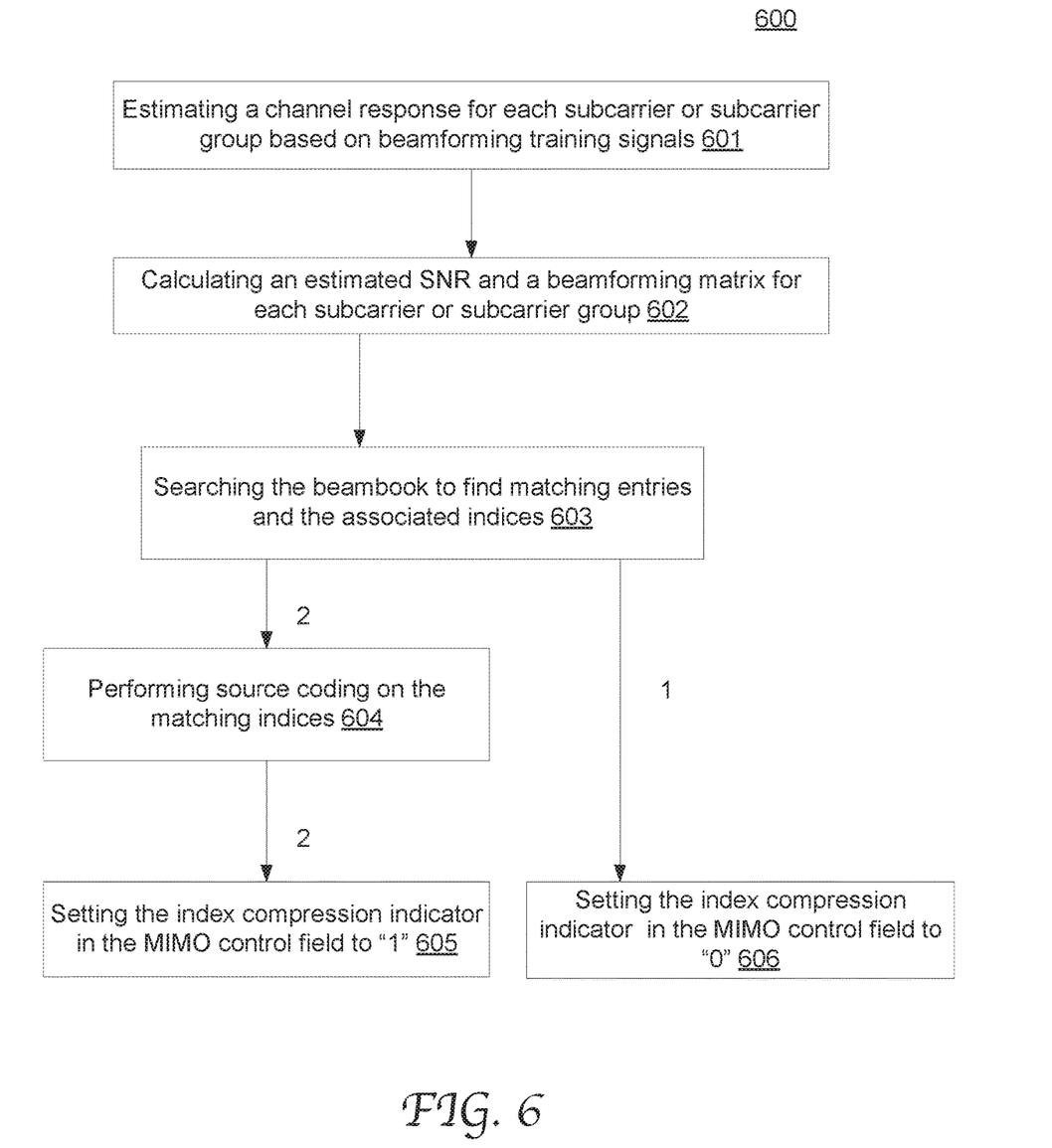
FIG. 6 is a flow chart depicting an exemplary process of generating a beamforming feedback report in which beambook indices are used to represent the beamforming feedback matrices in accordance with an embodiment of the present disclosure.

FIG. 6 is a flow chart depicting an exemplary process 600 of generating a beamforming feedback report in which beambook indices are used to represent the beamforming feedback matrices in accordance with an embodiment of the present disclosure. Process 600 can be performed by a beamformee STA. At 601, the beamformee estimates the channel response for each subcarrier or subcarrier group based on beamforming training signals, e.g., included in a NDP transmitted from the beamformer. At 602, an estimated SNR and a beamforming feedback matrix are calculated for the subcarrier or the subcarrier group. At 603, the generated matrices are used to search the beambook for matching entries, resulting in beambook indices of the matching entries.

In this embodiment, the beamformee is capable of generating beambook indices for inclusion in the report in 2 possible modes: compressed or non-compressed. The reporting message (e.g., a CSI frame) includes an MIMO control field with an index compression indicator which is defined to signal whether source coding compression is applied to the reported beambook indices. In some scenarios, as shown in path "1," the matching beambook indices are specified directly in the reporting message. Accordingly, at 606, the index compression indicator in the MIMO control field is set to "0." In some other scenarios, as shown in path "2," source coding compression is performed on the matching beambook indices at 604 and the compressed indices are specified in the reporting message. Accordingly, the index compression indicator in the MIMO control field is set to "1" at 605.

Figure 7:
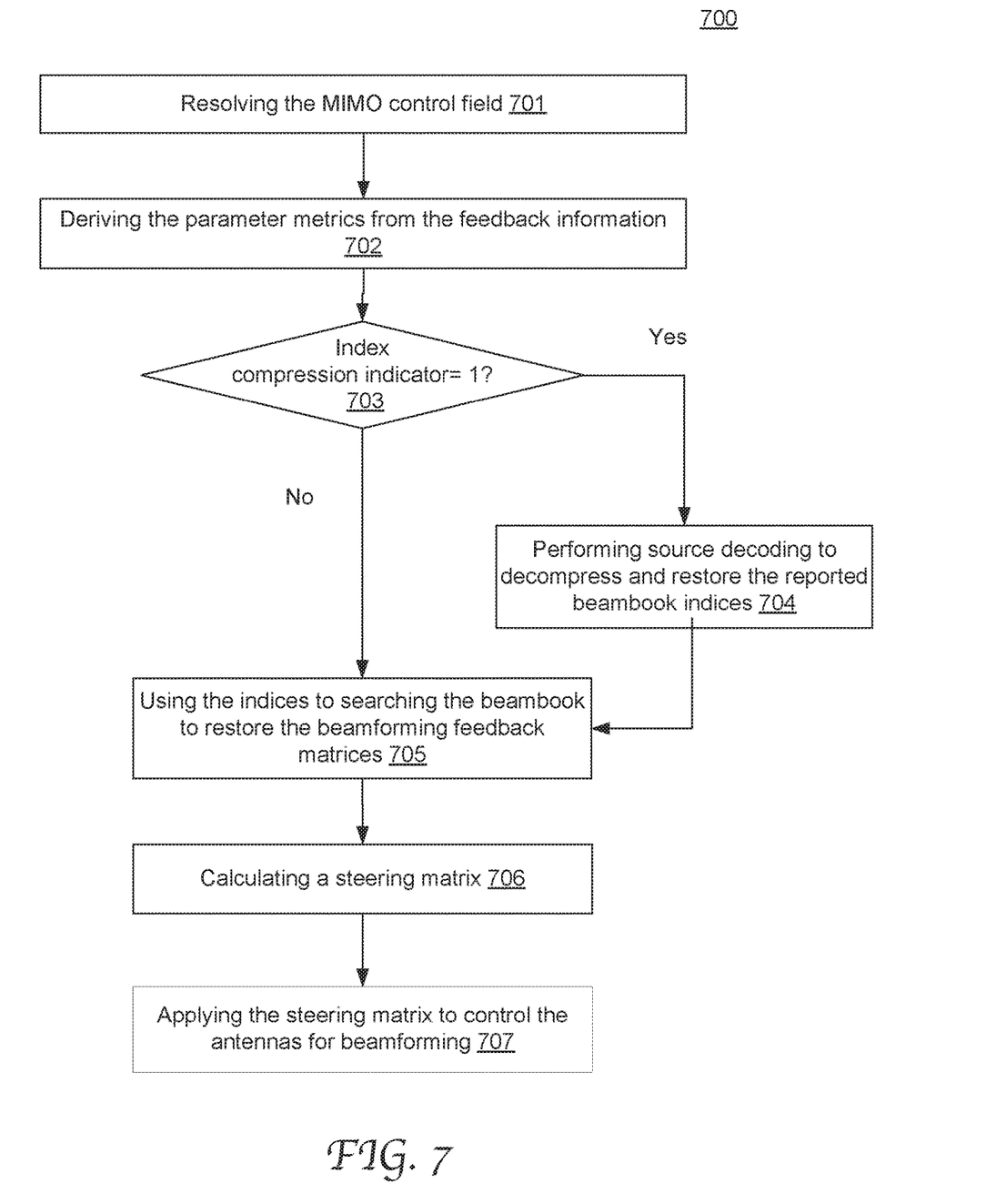
FIG. 7 is a flow chart depicting an exemplary process of beamforming in response to a beamforming feedback report and the index compression indicator in accordance with an embodiment of the present disclosure.

FIG. 7 is a flow chart depicting an exemplary process 700 of beamforming in response to a beamforming feedback report and the index compression indicator in accordance with an embodiment of the present disclosure. Process 700 can be performed in response to a received CSI frame by a beamformer STA, e.g., an AP STA. The CSI frame includes a MIMO control field with a further compression indicator. At 701, the beamformer resolves the MIMO control field, and derives the parameter metrics from the feedback information at 702. At 703, it is determined whether the index compression is indicated, e.g., the indicator value equals to "1." If yes, at 704, source decoding is performed to decompress the feedback information in the feedback report field into reported beambook indices. If the indicator value equals to "0," no decompression process is performed on the feedback information in the feedback report field. In both scenarios, at 705, the reported indices are used to search the beambook to find the associated beamforming matrices. A steering matrix 706 is then calculated by using the found matrices. At 707, the steering matrix is applied to control the antennas for subsequent beamforming data transmission.

In some embodiments, STAs in a WLAN support may support both beamforming matrix feedback and beambook feedback, each described in greater detail as above. The MIMO control field may have a field for indicating the feedback mode as well as SU/MU mode. For example, a 2-bit indicator may be used as follows:
 00: SU with Compressed feedback
 01: MU with Compressed feedback
 10: SU with Beambook feedback
 11: MU with Beambook feedback However, this discussion is exemplary; any other suitable manner of indicating a feedback mode can be used without departing from the scope of the present disclosure.

Figure 8:
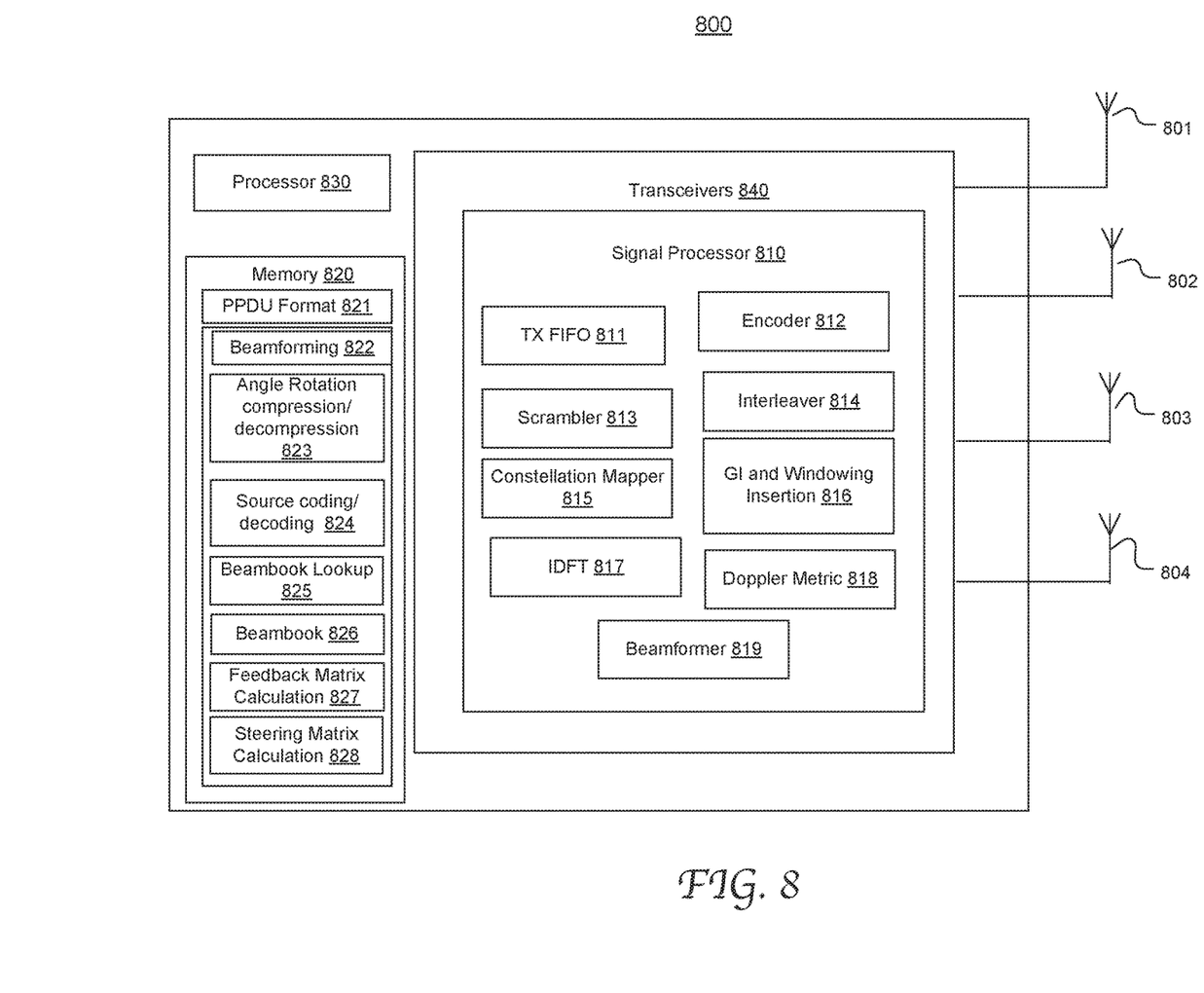
FIG. 8 is a block diagram illustrating an exemplary wireless communication device configured to generate and/or resolve beamforming feedback information with reduced sizes in accordance with an embodiment of the present disclosure.

FIG. 8 is a block diagram illustrating an exemplary wireless communication device 800 configured to generate and/or resolve beamforming feedback information with reduced sizes in accordance with an embodiment of the present disclosure. The device 800 may be an AP STA, a repeater, a coordinator, or a non-AP STA having a transceiver configured for data communication, e.g., a general purpose computer, a smart phone, a tablet wearable device, a sensor used on Internet of Things (IoT), and etc. In this embodiment, device 800 is equipped to operate as both a beamformer STA and a beamformee STA. In some other embodiments, device 800 may only operate either as a beamformer STA or a beamformee STA.

The device 800 includes a main processor 830, memory 820, a WIFI transceiver 840 coupled to an array of antenna 801~804. The memory 820 includes a PPDU format module 821 storing various packet formats. The module 821 has processor-executable instructions and information related to setting indications of source coding further compression and/or index compression indication.

The memory 820 includes a beamforming module 822 storing processor-executable instructions and information related to generating beamforming training signals, generating beamforming feedback information based on received beamforming training signals, beamforming for data transmission, and etc. Particularly, an angle rotation compression/decompression module 823 stores processor-executable instructions and information for compressing/decompressing beamforming feedback matrices, e.g., according to Givens rotations. A source coding/decoding module 824 stores processor-executable instructions and information for further compressing beamforming feedback matrices that have been subject to angle compression, compressing beambook indices, decompressing reported beamforming feedback information, and decompressing beambook indices.

The beambook 826 is a lookup table storing a set of predetermined beamforming vectors for each subcarrier, each vector associated with an index. The beambook lookup module 825 stores instructions and information for a search engine used to search for matching entries in the beambook 826. The feedback matrix calculation module 827 and the steering matrix calculation module 828 are configured to calculate beamforming feedback matrices based on received beamforming training signal and to calculate a steering matrix based on beamforming feedback matrices, respectively.

The transceiver 840 includes various modules of the transmit path in a signal processor 810, the modules configured to generate data packets, control frames, or any other type of communication transmission units for transmission to another STA. For instance, it has a transmit First-In-First-Out (TX FIFO) 811, an encoder 812, a scrambler 813, an interleaver 814, a constellation mapper 815, an inversed discrete Fourier transformer (IDFT) 817, a GI and windowing insertion module 816, a Doppler metric module 818, and a beamformer module 819. The transceiver 840 also includes various modules of a receive path configured to receive data packets, control frames, or any other type of communication transmission units from another STA.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of beamforming performed by a first wireless station (STA) in a wireless local area network (WLAN), the method comprising:
 receiving a null data packet (NDP) at a first set of antennas comprised in said first wireless STA, wherein said NDP is transmitted from a second wireless STA through a wireless channel and comprises beamforming training signals;
 estimating a channel response of said wireless channel based on said beamforming training signals;
 generating a beamforming feedback matrix based on an estimated channel response, wherein said beamforming feedback matrix corresponds to a subcarrier or a subcarrier group in said wireless channel, and wherein said generating said beamforming feedback matrix comprises generating a channel metric based on said estimated channel response, wherein said generating a beamforming feedback matrix is based on said channel metric, and wherein said channel metric corresponds to a difference between said estimated channel response and an average of a plurality of estimated channel responses comprising said estimated channel response;
 performing angle compression on said beamforming feedback matrix to generate first compressed beamforming feedback; and
 performing source coding to compress said first compressed beamforming feedback to generate second compressed beamforming feedback.

2. The method of claim 1, wherein said performing said source coding comprises performing arithmetic coding.

3. The method of claim 1, wherein said channel metric corresponds to a subspace projection between said estimated channel and a space of estimated channels corresponding to neighboring subcarriers of said subcarrier.

4. The method of claim 1, further comprising:
 transmitting a message to said second wireless STA, wherein said message comprises a beamforming report field specifying said second compressed beamforming feedback; and
 setting a first field in said message to a first value for indicating to said second wireless STA that said second compressed beamforming feedback results from said source coding.

5. The method of claim 4, wherein said first field is defined to carry one of: said first value; a second value indicating that information specified in said beamforming report field results only from said angle compression; and a third value indicating that information specified in said beamforming report field is uncompressed.

6. The method of claim 4, wherein said message comprises a channel station information (CSI) frame, and wherein further said first field is a multiple input multiple output (MIMO) control field.

7. A method of beamforming performed by a first wireless station (STA) in a wireless local area network (WLAN), the method comprising:
- transmitting a null data packet (NDP) to a second wireless STA through a first set of antennas, wherein said NDP comprises beamforming training signals;
- receiving a message from said second wireless STA, wherein said message comprises a beamforming report field representing a compressed beamforming matrix associated with a subcarrier or a subcarrier group;
- performing source decoding to decompress information in said beamforming report field and to generate first decompressed beamforming information; and
- performing angle decompression on said first decompressed beamforming information to generate a beamforming feedback matrix.

8. The method of claim 7, wherein said source decoding comprises an arithmetic decoding process.

9. The method of claim 7, wherein said source decoding and said angle decompression are performed responsive to an indication in a first field of said message, wherein said first field is defined to carry one of three values comprising: said first value indicating that information in said beamforming report field results from to both angle compression and source coding; a second value indicating that information in said beamforming report field results from only angle compression; and a third value indicating that information in said beamforming report field is uncompressed.

10. The method of claim 9, wherein said message further comprises a channel state information (CSI) frame, and wherein further said first field is a multiple input multiple output (MIMO) control field.

11. The method of claim 9, further comprising deriving a signal noise ratio from information specified in said beamforming report field.

12. A method of beamforming in wireless communication performed by a first wireless station (STA), the method comprising:
- receiving a null data packet (NDP) at a first set of antennas comprised in said first wireless STA, wherein said NDP is transmitted from a second wireless STA through a wireless channel and comprises beamforming training signals;
- estimating a channel response of said wireless channel based on said beamforming training signals;
- generating a beamforming feedback matrix based on an estimated channel response, wherein said beamforming feedback matrix corresponds to a subcarrier or a subcarrier group in said wireless channel;
- accessing a beambook resident on said first wireless STA, wherein said beambook comprises a plurality preloaded entries associated with said subcarrier or said subcarrier group, wherein each preloaded entry comprises a beambook index and a predetermined beamforming vector;
- searching said beambook to match said beamforming feedback matrix with a predetermined beamforming vector and determine a select beambook index; and
- transmitting a message to said second wireless STA via said wireless channel, wherein said message comprises a representation of said selected beambook index.

13. The method of claim 12, wherein said message further comprises values of one or more of: signal-noise ratio; transmission power; and a channel variation metric that result from said estimating.

14. The method of claim 12, further comprising:
- compressing said select beambook index to generate a compressed beambook index; and
- setting a first field in said message to indicate that said representation results from a compression process.

15. The method of claim 12, wherein said generating said beamforming feedback matrix comprises:
- generating a channel metric based on said estimated channel response; and
- generating said beamforming feedback matrix based on said channel metric.

16. The method of claim 15, wherein said channel metric corresponds to a subspace projection between said estimated channel and a space of estimated channels corresponding to neighboring subcarriers of said subcarrier.

17. The method of claim 15, wherein said channel metric corresponds to a difference between said estimated channel and an average of a plurality of estimated channels comprising said estimated channel.

18. The method of claim 14, wherein said message comprises a channel station information (CSI) frame, and wherein further said first field is a multiple input multiple output (MIMO) control field.

* * * * *